United States Patent [19]

Westerbeek et al.

[11] Patent Number: 5,462,759
[45] Date of Patent: Oct. 31, 1995

[54] POWDER-FORM, FOAMING CREAMER

[75] Inventors: Johannes M. M. Westerbeek, Rosmalen; Jeroen T. M. Dijkgraaf, Veghel, both of Netherlands; Joseph B. S. Zijlmans, Oneonta, N.Y.

[73] Assignee: Campina-Melkunie bv, Veghel, Netherlands

[21] Appl. No.: 90,949

[22] Filed: Jul. 13, 1993

[30] Foreign Application Priority Data

Jul. 14, 1992 [NL] Netherlands ............. 9201264

[51] Int. Cl.$^6$ ................. A23J 3/00; A23L 2/40
[52] U.S. Cl. ............ 426/568; 426/470; 426/477; 426/591; 426/613; 426/658
[58] Field of Search ............... 426/589, 613, 426/470, 564, 568, 658, 591, 477

[56] References Cited

U.S. PATENT DOCUMENTS

| | | | |
|---|---|---|---|
| 4,390,450 | 6/1983 | Gibson et al. | 252/307 |
| 4,438,147 | 3/1984 | Hedrick, Jr. | |
| 4,505,943 | 3/1985 | Dell et al. | 426/565 |
| 5,284,674 | 2/1994 | Fazio | 426/580 |

FOREIGN PATENT DOCUMENTS

| | | |
|---|---|---|
| 458310 | 5/1991 | European Pat. Off. |
| 1140937 | 1/1969 | United Kingdom |
| 2131669 | 6/1984 | United Kingdom |

OTHER PUBLICATIONS

William J. Stadelman, et al., Egg Science and Technology 2nd Ed., AVI Publishing Connecticut, 1977, pp. 248–253.
Knightly, W. H., "The role of ingredients in the formulation of coffee whiteners", *Food Technology* 23:37 (1969).

*Primary Examiner*—Steven Weinstein
*Assistant Examiner*—Curtis E. Sherrer
*Attorney, Agent, or Firm*—Browdy and Neimark

[57] ABSTRACT

This invention provides a powder-form foaming creamer for beverages, such as coffee, and soups, said creamer containing fat, carbohydrate and protein; said protein is chicken's egg-albumen which shows a superior foam-stabilizing activity, while the use of egg-albumen also confers to the foam a good stability upon stirring and an improved appearance.

20 Claims, 4 Drawing Sheets

△ SODIUM CASEINATE (BULK DENSITY = 80 g/l)
+ ALBUVIR (BULK DENSITY = 88 g/l)
○ EGG-ALBUMEN (BULK DENSITY = 108 g/l)

△ N-CREAMER-46/EGG-ALBUMEN (BULK DENSITY = 91 g/l)
+ SODIUM CASEINATE/ALBUVIR (BULK DENSITY = 74 g/l)

+ SODIUM CASEINATE / EGG-ALBUMIN (BULK DENSITY=91 g/l)

△ N-CREAMER-46 / EGG-ALBUMIN (BULK DENSITY = 70 g/l)

○ SMP (BULK DENSITY = 107 g/l)

+ SMP / EGG-ALBUMEN (BULK DENSITY = 100 g/l)

△ SMP / SODIUM CASEINATE (BULK DENSITY = 95 g/l)

⊕ EGG-ALBUMEN (BULK DENSITY = 70 g/l)

+ GLUCOSE SYRUP 50 DE, (BULK DENSITY =150 g/l)

△ GLUCOSE SYRUP 36 DE, (BULK DENSITY = 132 g/l)

○ LACTOSE, (BULK DENSITY = 140 g/l)

+ COCONUT FAT, (BULK DENSITY = 105 g/l)

△ PALM KERNEL FAT, (BULK DENSITY = 132 g/l)

○ MILK-FAT, (BULK DENSITY = 140 g/l)

○ 10% OF COCONUT FAT, (BULK DENSITY = 87 g/l)

△ 20% OF COCONUT FAT, (BULK DENSITY = 98 g/l)

+ 30% OF COCONUT FAT, (BULK DENSITY = 105 g/l)

POWDER-FORM, FOAMING CREAMER

FIELD OF THE INVENTION

This invention relates to a powder-form foaming creamer and the production thereof and the use thereof as a foaming agent at the surface of hot liquids.

DESCRIPTION OF THE BACKGROUND ART

EP 154 192 discloses a process for preparing a powder-form composition for a beverage, which composition contains fat, protein, lactose and other carbohydrates, as well as 0.3–1% by weight of a stabilizing salt, such as phosphate or citrate, said salt providing stability against coagulation when the composition is added to a hot beverage having a low pH, such as coffee; according to this process the components are preheated in suspension or solution, the concentrated to a solids content of 46–60% by weight and finally spray-dried; the ratio by weight of proteins to lactose in the final composition is from 1:3.5 to 1:5. If desired, this powder-form composition can be made foam-producing when added to a beverage by introducing an inert gas under low pressure into the concentrate, highly compressing the gas and the concentrate after mixing and then injecting the mixture through a nozzle into a spray-drying tower where it is dried by spraying into a stream of hot air consisting of several different small streams. In the examples of this publication two embodiments are disclosed, i.e. using milk as a protein source (milk contains whey-protein and casein as proteins) and without milk, in which case sodium caseinate is used as a source of protein.

U.S. Pat. No. 4,438,147 discloses a foaming powder-form creamer for beverages such as a cocoa beverage; for the preparation of this creamer a liquid mixture is used as the starting material, comprising water and solids, said solids containing at least about 5% non-dairy fat, at least about 30% water-soluble non-dairy carbohydrate and between 0% to about 50% skim milk (dry), as well as a proteinaceous foam stabilizer, i.e. sodium caseinate. The mixture is blended with an inert gas and spray-dried by forcing the mixture through an orifice and contacting the mixture with a gas at an elevated temperature.

EP 458 310 discloses a foaming creamer in powder-form, which contains fat, lactose, alkali metal phosphate, dry solids of skim milk and caseinate as a foam stabilizer and has been obtained by treating the components in an aqueous mixture with $CO_2$ or $N_2$ and then subjecting to spray-drying.

SUMMARY OF THE INVENTION

The invention provides a powder-form foaming creamer, containing 5–40% by weight of fat, 30–80% by weight of carbohydrates, 1–10% by weight of chicken's egg-albumen and 0–4% by weight of a stabilizing salt, said percentages being based on the sum of the amounts of these components; this creamer is intended to be added to hot beverages and soups to provide a creamy and stable foam at the surface.

DETAILED DESCRIPTION OF THE EMBODIMENTS

Figure 1:
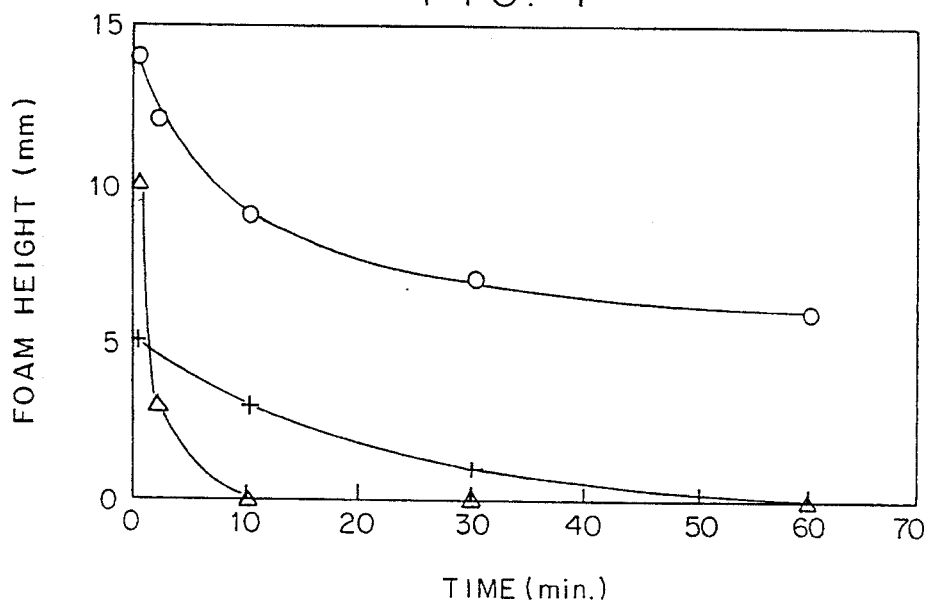
FIG. 1 is a graph of a foam test with foaming coffee creamers based on different proteins.

It has been found that egg-albumen is a better foam stabilizer than milk-proteins (whey-protein, casein or caseinate). The egg-albumen causes a very effective encapsulation of the air bubbles in a hot foam. That the egg-albumen as a foam stabilizer in creamers is superior to whey-protein and casein or caseinate was not only not predictable, but is the more surprising when considering that egg-albumen—contrary to milk-proteins—exhibits already at room temperature a strong tendency to denaturation during foaming and then becomes insoluble, while it was also known that upon heating egg-albumen becomes water-insoluble. Both effects occur already during the preparation of the product, i.e. before the product is finally made to foam upon combining with a hot beverage; prior to spray-drying heating is carried out and just before and during spray-drying the mixture is foamed by the gas injection. Despite the considerable thermal degradation (which of course also takes place during the addition to the hot beverage) the egg-albumen is still capable of producing and stabilizing foam and even exhibits a better performance than milk-proteins which are used for this purpose in the prior art.

Furthermore, the application of egg-albumen provides a superior stability upon stirring and an improved appearance compared to milk-protein.

A further advantage of the application of egg-albumen is that a product can be prepared which is completely free of milk-ingredients and therefore can be consumed by humans suffering from cow-milk protein-intolerance and lactose-intolerance. In particular a high incidence of lactose-intolerance can be found in humans (no conversion of lactose to glucose and galactose takes place in the gastrointestinal tract because the enzyme lactase is lacking, which leads to diarrhea and flatulence). Furthermore, the avoidance of milk ingredients has the advantage that when using e.g. molasses having a relatively low DE value as carbohydrate, the product is much less hygroscopic than a product which is prepared using lactose as a source of hydrocarbon; the uptake of moisture leads to lumps and therefore to a retarded solubility, whereby also the ability to foam is lost.

The powder-form foaming creamer can be prepared according to usual methods, e.g. by first preparing an emulsion of fat, carbohydrates and optionally an emulsifier and optionally a stabilizing salt, if desired pasteurizing the emulsion at 60°–95° C. in order to obtain a microbially stable product, homogenizing the mixture, injecting an inert gas (e.g. nitrogen) under high pressure and then spray-drying the mixture, e.g. in a common spray-drying tower equipped with a nozzle. The above-described method wherein pasteurizing and an emulsifier are employed, is preferred. Of course also other variants of the preparation of a foaming material of the present type are possible.

The egg-albumen is preferably used in an amount of 4–8% by weight.

As emulsifier, for example a modified starch, such as the octenyl-succinate ester of starch, can be used in an amount of 1–10%. Also sodium caseinate can act as an emulsifier, e.g. in an amount of 2–10%. The emulsifier can be combined with a salt, such as phosphate or citrate, which acts as an emulsion stabilizer and also stabilizes against the coagulation of the protein at elevated temperature and low pH.

The fats confer the whitening power as well as a creamy appearance; moreover, the egg-albumen adds to a creamy appearance of the foam. Examples of fats are vegetable fats (hydrogenated or non-hydrogenated) and animal fats, in particular soy, coconut and palm fat.

The carbohydrate causes good wetting of the creamer. As a carbohydrate lactose can be used, but in view of the above discussed lactose-intolerance it is in many cases advantageous to replace the lactose by e.g. glucose syrup, a glucose syrup having a high DE value (i.e. a DE value of more than 50) is in particular suitable for this purpose because it also provides sweetening power. Furthermore maltodextrins, sucrose and the like can be used as carbohydrates.

The present powder can be added to beverages such as coffee and chocolate-milk, but also to soups, in particular cream-like soups. At an elevated temperature foaming occurs spontaneously. The powder can be added to the heated beverage or soup but also the beverage or soup can be added to the powder; in the case of soup the powder can be previously combined with the non-heated soup and the consumer can heat the mixture.

EXAMPLE I

Comparison of Egg-Protein With Whey-Protein and Sodium Caseinate

| Composition | Variant 1 | Variant 2 | Variant 3 |
|---|---|---|---|
| egg-albumen | 6.0% | — | — |
| whey-protein isolate | — | 6.0% | — |
| sodium caseinate (NaCas) | — | — | 6.0% |
| coconut fat (m.p. 30–34° C.) | 15.0% | 15.0% | 15.0% |
| glucose syrup (36 DE) | 77.0% | 77.0% | 77.0% |
| dipotassium phosphate | 2.0% | 2.0% | 2.0% | egg-albument : P-39 (Henningsen, van den Burg, Netherlands)
whey-protein : ALBUVIR (ULN, France)
sodium caseinate : EM-7 (DMV-International, Netherlands)

Preparation

The protein powder is dissolved in water at 45° C., together with the glucose syrup. To this solution the molten coconut fat is added at 60° C. and mixing is carried out in such a way that visually a homogeneous pre-emulsion is obtained. The obtained mixture has a dry solids content of 40–45%. Then the temperature is quickly increased to 75° C. and the pre-emulsion is maintained at this temperature during 10 minutes. After that the phosphate is added to the mixture and homogenized at 100 bars and 70° C. Subsequently the emulsion is dried with a compact spray-dryer (indirect heating of the inlet air to 155° C.; temperature of the outlet air is 90° C.; temperature of the supplied mixture 70° C.). In the feeding pipe to the nozzle carbon dioxide gas is injected under pressure from a gas cylinder (directly behind the high pressure pump which pumps the mixture to the tower chamber) in such an amount that the bulk density of the powder is low, i.e. about 80–110 g/l.

Examination of the Foaming Behaviour of the Composition 4 g of foaming coffee-creamer is mixed with 3 g of powder sugar. This mixture is transferred to a narrow, high 250 ml beaker and 80 g of liquid coffee having a temperature of 80° C. is poured onto the powder. The cappuccino mixture is stirred with a small spoon in such a way that the powder can no longer or hardly be visually detected. After the foam has been formed within a few seconds, the height is measured in mm. After 2 minutes the mixture is stirred again and the height of the foam is measured again. Subsequently the foam height is measured again after 10 minutes, 30 minutes and 60 minutes.

Results

In FIG. 1 the results of the foam tests with foaming coffee-creamers based on different proteins are shown. Not only can it be seen that foaming is strongest with chicken's egg-albumen, but, more important, that the foam is much more stable. With sodium caseinate an acceptable foam height is obtained, but the foam collapses completely within a few minutes. Thus, as such the sodium caseinate is absolutely unsuitable for this application. With whey-protein isolate a clearly improved foam-stability is obtained. However, the stability is considerably less than with egg-protein.

A good froth head also requires a good stability upon stirring. In the case of the composition based on egg-protein, this stability upon stirring is again clearly superior. The foam is practically insensitive to stirring for the first 30 minutes, in contrast to the foam from the whey protein isolate. The foam of the composition based on sodium caseinate is absolutely instable upon stirring.

Also the appearance of the foam after a certain holding time is of great importance for the consumption of a cup of cappuccino. In the case of the caseinate-containing composition the foam appeared to have completely disappeared after 10 minutes. With the composition based on the whey-protein isolate, a partly coarsened foam having locally large air bubbles (d>1 mm) is formed. In general this foam does not have a particular pleasant appearance. In the case of the egg-albumen variant a foam with very fine bubbles, which hardly shows a tendency to be coarsened, is formed. A general characterization of the cappuccino prepared with egg-albumen, was that a "creamy, strong" foam was obtained.

EXAMPLE II

Comparison of Egg-Albumen With a Combination of Whey-Protein and Sodium Caseinate At a relatively high fat content it is preferred to incorporate also an emulsifier, such as the octenyl succinate ester of starch or sodium caseinate, into the composition. A high fat content is for instance important for increasing the whitening power and for improving the mouthfeel of the foaming coffee-creamer.

| Composition | Variant 1 | Variant 2 |
|---|---|---|
| Egg-albumen | 5.0% | — |
| Whey-protein isolate | — | 5.0% |
| sodium caseinate | — | 5.0% |
| octenyl succinate of starch*) | 5.0% | — |
| coconut fat (m.p. 30–34° C.) | 30.0% | 30.0% |

-continued

| Composition | Variant 1 | Variant 2 |
| --- | --- | --- |
| glucose syrup (36 DE) | 57.0% | 57.0% |
| disodium phosphate | 3.0% | 3.0% |

*)N-CREAMER-46 of National Starch It is remarked that in variant 2 both milk-proteins (whey-protein and casein) are present.

Preparation

The protein powders and in the case of variant 1 the emulsifier are dissolved together with the glucose syrup in water at 45° C. To this solution the molten coconut fat is added at 60° C. and mixing is carried out in such a way that visually a homogeneous pre-emulsion is obtained. In this stage the mixture has a dry solids content of 40 to 45%. Then the temperature is quickly increased to 90° C. and the pre-emulsion is maintained at this temperature for 10 minutes. Subsequently phosphate is added to the mixture and a homogenisation step at 100 bars and at 70° C. is carried out. Finally the emulsion is dried with a pilot-spray dryer under the conditions described in Example I. In the pipe to the nozzle carbon dioxide gas is injected under pressure from a gas cylinder in such an amount that the bulk density of the powder is low, i.e. about 75–90 g/l.

Results

Figure 2:
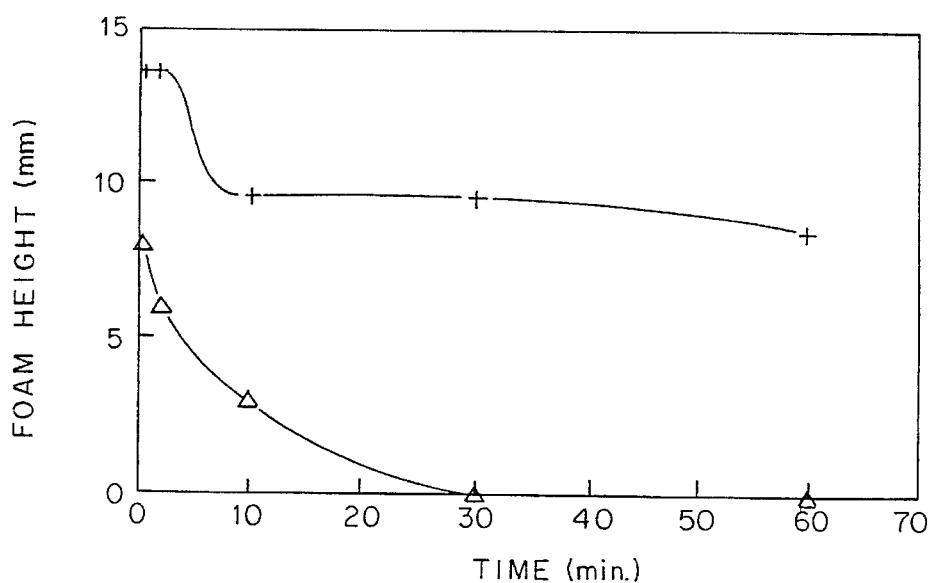
FIG. 2 is a graph of a foam test with foaming coffee creamer based on different proteins.

FIG. 2 shows the results of the foam tests with foaming coffee-creamers with different proteins. Again it appears that the highest foam is obtained with the composition based on egg-albumen and that the foam is much more stable. The appearance of the foam layer is considerably better for the variant based on egg-albumen, for also in this case separate air bubbles are visually hardly detectable again. Hereto it is remarked that the amount of protein in the composition designated as variant 2 is considerably larger than in variant 1 (which contains egg-albumen), while variant 2 is clearly inferior to variant 1.

EXAMPLE III

Comparison of Different Emulsifiers

| Composition | Variant 1 | Variant 2 |
| --- | --- | --- |
| egg-albumen | 5.0% | 5.0% |
| N-CREAMER-46 of National Starch | — | 5.0% |
| Sodium caseinate | 5.0% | — |
| coconut fat (melting point 30–34° C.) | 30.0% | 30.0% |
| glucose syrup (36 DE) | 57.0% | 60.0% |
| dipotassium phosphate | 3.0% | — |

Preparation

The protein, the glucose syrup and the emulsifier are dissolved in water at 45° C. To this solution the molten coconut fat is added at 60° C., and mixing is carried out in such a way that visually a homogeneous pre-emulsion is obtained. The resulting mixture has a dry solids content of 40–45%. Then the temperature is quickly increased to 90° C. and the pre-emulsion is maintained at this temperature for 10 minutes. Subsequently the phosphate is added to the mixture. In the case of variant 2 no phosphate is added. Then homogenisation at 100 bars and 70° C. takes place. Subsequently the emulsion is dried with a pilot spray-dryer under the conditions described in Example I. In the feeding pipe to the nozzle carbon dioxide gas from a gas cylinder is injected under pressure in such an amount that the bulk density of the powder is low, i.e. about 70–90 g/l.

Results

Figure 3:
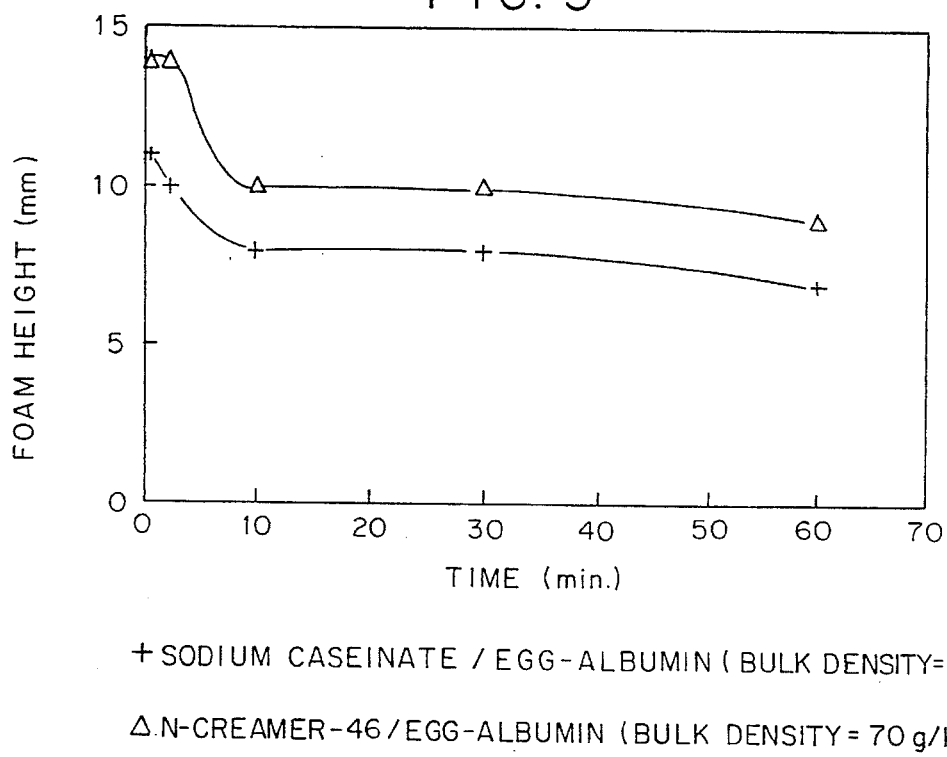
FIG. 3 is a graph of a foam test with foaming coffee creamers based on different emulsifiers.

FIG. 3 shows the results of the foam tests with foaming coffee-creamers based on different emulsifiers. From the figure it clearly appears that it does not make any difference whether the emulsifier is derived from milk or another synthetic emulsifier is used. In fact this test shows that an excellent foaming creamer can be prepared without the use of milk ingredients. In addition, a stabilizing salt for the emulsifying process is not longer necessary to prepare a good foam product.

EXAMPLE IV

Comparison of Egg-Albumen With Milk and Milk+Caseinate

| Composition | Variant 1 | Variant 2 | Variant 3 | Variant 4 |
| --- | --- | --- | --- | --- |
| egg-albumen | — | — | 5.0% | 5.0% |
| skim milk powder (MH-medium heat | 30.0% | 15.0% | — | 15.0% |
| sodium caseinate | — | 5.0% | — | — |
| emulsifier (N-CREAMER-46) | — | — | 5.0% | — |
| coconut fat (m.p. 30–40° C.) | 25.0% | 25.0% | 30.0% | 25.0% |
| glucose syrup (36 DE) | 42.5% | 52.5% | 60.0% | 52.5% |
| dipotassium phosphate | 2.5% | 2.5% | — | 2.5% |

Preparation

The protein powders and the glucose syrup are dissolved in water at 45° C. To this solution the molten coconut fat is added at 60° C., and mixing is carried out in such a way that visually a homogeneous pre-emulsion is obtained. The resulting mixture has a dry solids content of 40–45%. Then the temperature is quickly increased to 80° C. in the case of variants 1 and 2 and to 90° C. in the case of variant 3, and the pre-emulsion is maintained at this temperature for 10 minutes. Subsequently the phosphate is added to the mixture in the case of variants 1, 2 and 4. Homogenisation is carried at 100 bars and 70° C. Then the emulsion is dried with a spray dryer under the conditions described in Example I. In the feedpipe to the nozzle carbon dioxide gas from a gas cylinder is injected in such an amount that the bulk density of the powder is low, i.e. about 70–110 g/l.

Results

Figure 4:
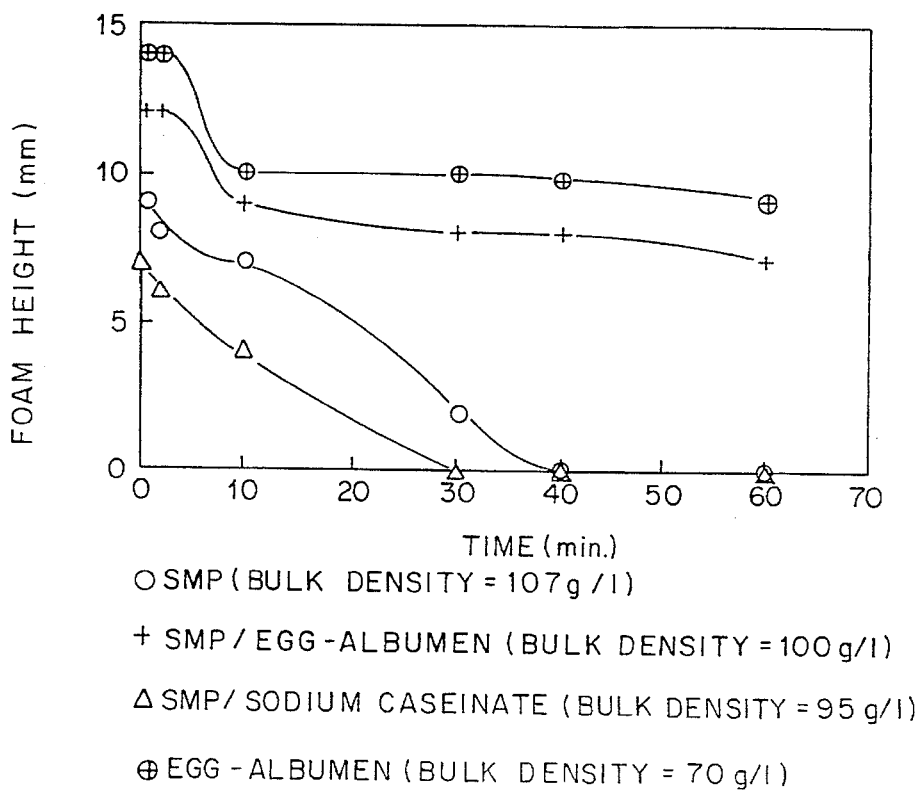
FIG. 4 is a graph of a foam test with foaming coffee creamers based on milk proteins (SMP) and egg albumen.

FIG. 4 shows the results of foam tests with foaming coffee-creamers based on milk proteins. It can be seen that with the composition of variant 3 (egg-albumen) better results are obtained than with variant 1 (milk) and with variant 2 (milk+caseinate), while in the composition of variant 3 the amount of protein is smaller than with variants 1 and 2 (in the latter two compositions the amounts of protein are the same). The results with variant 4 (wherein the amount of protein is equal to the amounts in variants 1 and 2) shows that substituting a part of the milk powder in variant 1 by protein gives a superior result.

EXAMPLE V

Influence of the Type of Carbohydrate

| Composition | Variant 1 | Variant 2 | Variant 3 |
| --- | --- | --- | --- |
| egg-albumen | 4.0% | 4.0% | 4.0% |
| sodium caseinate | 6.0% | 6.0% | 6.0% |
| lactose | 57.5% | — | — |
| glucose syrup (50 DE) | — | 57.5% | — |
| glucose syrup (36 DE) | — | — | 57.5% |
| coconut fat (mp. 30–34° C.) | 30.0% | 30.0% | 30.0% |
| dipotassium phosphate | 2.5% | 2.5% | 2.5% |

Preparation

The protein powder and the sugars are dissolved in water at 45° C. To this solution the molten fat is added at 60° C. and mixing is carried out in such a way that visually a homogeneous pre-emulsion is obtained. The resulting mixture has a dry solids content of 40–45%. Then the temperature is quickly increased to 90° C. and the pre-emulsion is maintained at this temperature for 10 minutes. Subsequently the phosphate is added to the mixture and homogenisation is carried out at 150 bars and 170° C. Then the emulsion is dried with a pilot spray dryer under the conditions described in Example I. In the feedpipe to the nozzle carbon dioxide gas from a gas cylinder is injected under pressure in such an amount that the bulk density of the powder is low, i.e. about 130–150 g/l.

Results

Figure 5:
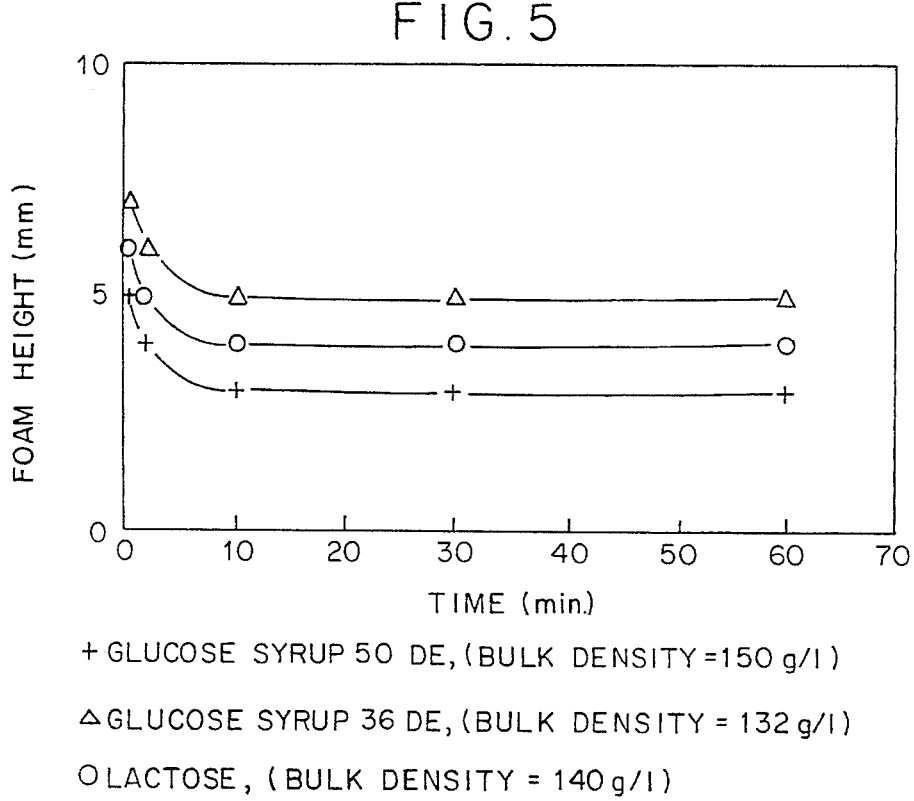
FIG. 5 is a graph of the foam height of products based on different carbohydrates.

FIG. 5 shows the results of foam tests products based on different carbohydrates. From this figure it can be seen that for the stability of the foam it does not make any difference which type of carbohydrate is used. The small differences in initial foam height are among other things connected with differences in bulk density and possibly with the dissolution rate of the product.

EXAMPLE VI

Influence of the Type of Fat

| Composition | Variant 1 | Variant 2 | Variant 3 |
| --- | --- | --- | --- |
| egg-albumen | 5.0% | 5.0% | 5.0% |
| sodium caseinate | 5.0% | 5.0% | 5.0% |
| coconut fat (mp. 30–34° C.) | 25.0% | — | — |
| palm kernel fat (mp. 34–36° C.) | — | 25.0% | — |
| Milk fat | — | — | 25.0% |
| glucose syrup 36 DE | 62.5% | 62.5% | 62.5% |
| dipotassium phosphate | 2.5% | 2.5% | 2.5% |

Results

The protein powder and the glucose syrup are dissolved in water at 45° C. To this solution the molten fat is added at 60° C. and mixing is carried out in such a way visually a homogeneous pre-emulsion is obtained. The resulting mixture has a dry solids content of 40–45%. Then the temperature is quickly increased to 90° C. and the pre-emulsion is maintained at this temperature for 10 minutes. Subsequently the phosphate is added to the mixture and homogenisation is carried out at 150 bars and 70° C. Then the emulsion is dried with a pilot spray dryer under the circumstances described in Example I. In the feedline to the nozzle carbon dioxide gas from a gas cylinder is injected under pressure in such an amount that the bulk density of the powder has a low value, i.e. about 100–140 g/l.

Results

Figure 6:
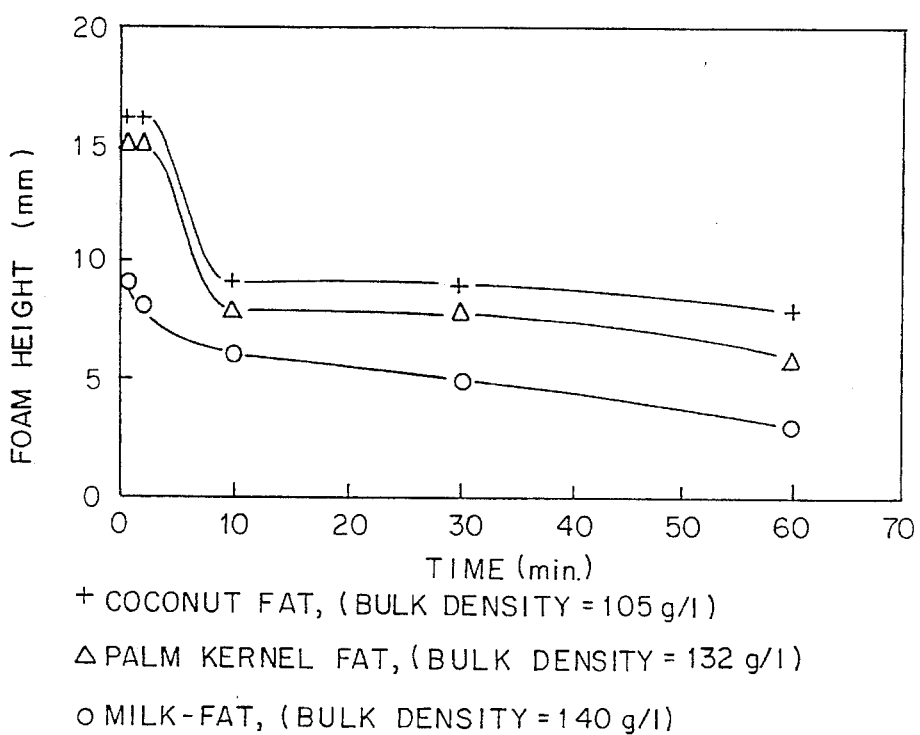
FIG. 6 is a graph of the foam height of products based different fats.

FIG. 6 shows the results of foam tests with products based on different fats. Instead of 4 g of foaming coffee-creamer 5.5 g of powder was added. From the curves it appears that with coconut fat and palm kernel fat comparable characteristics are obtained. Also with milk-fat an acceptable product can be made although the functionality is somewhat less.

EXAMPLE VII

Influence of the Amount of Fat

| Composition | Variant 1 | Variant 2 | Variant 3 |
| --- | --- | --- | --- |
| egg-albumen | 5.0% | 5.0% | 5.0% |
| sodium caseinate | 5.0% | 5.0% | 5.0% |
| coconut fat (mp. 30–34° C.) | 10.0% | 20.0% | 30.0% |
| glucose syrup 36 DE | 77.5% | 67.5% | 57.5% |
| dipotassium phospate | 2.5% | 2.5% | 2.5% |

Preparation

The protein powder and the glucose syrup are dissolved in water at 45° C. To this solution the molten fat is added at 60° C. and mixing is carried out in such a way that visually a homogeneous pre-emulsion is obtained. The resulting mixture has a dry solids content of 40–45%. Subsequently the temperature is quickly increased to 90° C. and the pre-emulsion is maintained at this temperature for 10 minutes. Then the phosphate is added to the mixture and homogenisation at 100 bars and 70° C. is carried out. Subsequently the emulsion is dried with a pilot spray-dryer under the circumstances described in Example I. In the feedpipe to the nozzle carbon dioxide gas from a gas cylinder is injected under pressure in an amount such that the bulk density of the powder is low, i.e. about 90–100 g/l.

Results

Figure 7:
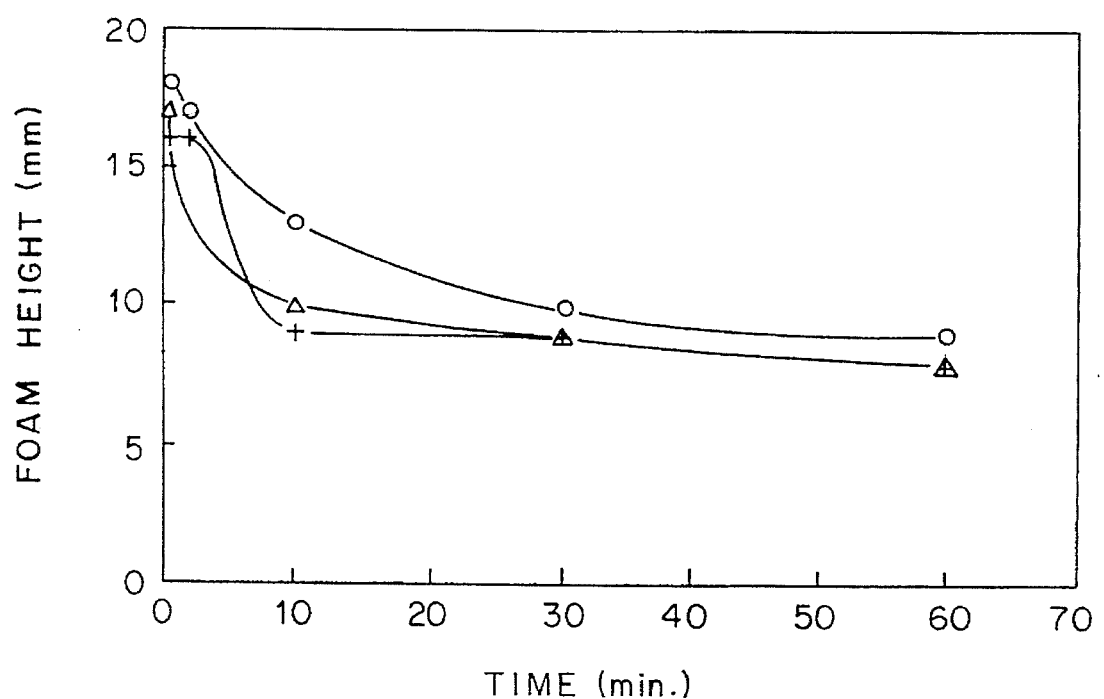
FIG. 7 is a graph of the foam height of products based on a variable fat content.

FIG. 7 shows the results of foam tests with products based on a variable fat content. Instead of 4 g of foaming coffee-creamer also in this case 5.5 g of powder was added. As appears from the figure the fat content is not critical for the functionality of the product. When the fat content is lowered, the whitening power of the product decreases.

What is claimed is:

1. A powder-form foaming creamer which provides a foam at the surface of hot beverages and soups, comprising:
   5–40% by weight of a fat component,
   30–80% by weight of a carbohydrate component,
   1–10% by weight of an egg-albumen component,
   0–4% by weight of a stabilizing salt component, said percentages being based on the sum of the amounts of said components.

2. A creamer according to claim 1, containing as said carbohydrate component maltodextrin, glucose syrup, lactose or sucrose or a combination of these sugars.

3. A creamer according to claim 2, containing as said fat component a hydrogenated or non-hydrogenated vegetable or animal fat.

4. A creamer according to claim 3, wherein said stabilizing salt component is selected from the group consisting of phosphates, citrates and mixtures thereof.

5. A creamer according to claim 4, containing 4–8% by weight of said egg-albumen component.

6. A creamer according to claim 1, containing as said fat component a hydrogenated or non-hydrogenated vegetable or animal fat.

7. A creamer according to claim 6, wherein said fat component is selected from the group consisting of soy, coconut and palm fat.

8. A creamer according to claim 7, containing 4–8% by weight of said egg-albumen component.

9. A creamer according to claim 1 wherein said stabilizing salt component is selected from the group consisting of phosphates, citrates and mixtures thereof.

10. A creamer according to claim 1, containing 4–8% by weight of said egg-albumen component.

11. A process for preparing a creamer according to claim 1, comprising
   a) using an emulsion of fat, carbohydrate, egg-albumen and optionally an emulsifier and optionally a stabilizing salt,
   b) pasteurizing said emulsion at a temperature between 60° C. and 95° C. and subsequently homogenizing the emulsion,
   c) introducing an inert gas under high pressure into the mixture; and
   d) subjecting the resulting mixture to a drying process.

12. A process according to claim 11, comprising using as said emulsifier sodium caseinate in an amount of 2–10%.

13. A process according to claim 11, comprising using as said emulsifier a modified starch.

14. A process according to claim 13, comprising using as said modified starch the octenyl-succinate ester of starch in an amount of 1–10% by weight.

15. Soup, containing a creamer according to claim 1.

16. Soup, containing a creamer according to claim 8.

17. Soup, containing a creamer according to claim 5.

18. In a method of making soup comprising mixing soup ingredients including a creamer, the improvement wherein said creamer is the foaming creamer of claim 1.

19. In a method of making soup comprising adding heated soup to a creamer, the improvement wherein said creamer is the foaming creamer of claim 1.

20. In a method of making soup comprising adding said powder-form foaming creamer to heated soup, the improvement wherein said creamer is the foaming creamer of claim 1.

* * * * *